United States Patent [19]
Rydelek et al.

[11] Patent Number: 6,078,749
[45] Date of Patent: Jun. 20, 2000

[54] ONE-TIME-USE CAMERA WITH OUTER COVER CONNECTED TO INNER FILM DOOR TO OPEN INNER FILM DOOR WHEN OUTER COVER DISENGAGED FROM CAMERA

[75] Inventors: James G. Rydelek, Henrietta; Edward N. Balling, Rochester, both of N.Y.

[73] Assignee: Eastman Kodak Company, Rochester, N.Y.

[21] Appl. No.: 09/250,802

[22] Filed: Feb. 17, 1999

[51] Int. Cl.[7] .................................................. G03B 17/24
[52] U.S. Cl. ................................................ 396/6; 396/536
[58] Field of Search ............................... 396/6, 535, 536, 396/25, 29, 27

[56] References Cited

U.S. PATENT DOCUMENTS 5,729,768   3/1998   Fields et al. .................................. 396/6

*Primary Examiner*—David M. Gray
*Attorney, Agent, or Firm*—Roger A. Fields

[57] ABSTRACT

A one-time-use camera comprises a main body part having a cartridge receiving chamber, a film cartridge in the chamber, a rear inner cover part having a door cover portion closing the chamber and supported to be pivoted open to permit the film cartridge to be removed from the chamber, a front inner cover part that together with the rear inner cover part house the main body part between them, and a pair of front and rear outer covers connected to one another over the front and rear inner cover parts. The rear outer cover is engaged releasably with the front outer cover to permit the rear outer cover to be disengaged from the front outer cover and is connected with the door cover portion to pivot the door cover portion open when the rear outer cover is disengaged from the front outer cover.

6 Claims, 8 Drawing Sheets

ONE-TIME-USE CAMERA WITH OUTER COVER CONNECTED TO INNER FILM DOOR TO OPEN INNER FILM DOOR WHEN OUTER COVER DISENGAGED FROM CAMERA

FIELD OF THE INVENTION

The invention relates generally to the field of photography, and in particular to one-time-use cameras. More specifically, the invention relates to a one-time-use camera with an outer cover that is connected to an inner film door to open the inner film door when the outer cover is disengaged from the camera.

BACKGROUND OF THE INVENTION

Film and cameras that are all in one, commonly referred to as single-use or one-time-use cameras, have become well known. The one-time-use camera is a simple point-and-shoot type comprising an opaque main body part which supports a conventional film cartridge in a cartridge receiving chamber, an unexposed film roll prewound on a film spool in a film supply chamber, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a rotatable frame counter for indicating the number of exposures remaining to be made on the filmstrip, a direct see-through viewfinder, and in some models an electronic flash. A pair of opaque front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used camera parts may be recycled, i.e. reused, to remanufacture the camera.

Prior Art Problem

More recently, as in prior art U.S. Pat. No. 5,761,542 issued Jun. 2, 1998, a fracture line of weakness or v-shaped groove divides a film door cover portion of the rear cover part and a remaining cover portion of the rear cover part along a pivot axis of the film door cover portion. The film door cover portion can be pivoted open relative to the remaining cover portion to permit the film cartridge to be removed from the cartridge receiving chamber.

To make the one-time-use camera a water-resistant type, it is known to add a pair of transparent front and rear outer covers that water-tightly connect to one another over the opaque front and rear cover parts. However, to pivot the film door cover portion open in order to remove the film cartridge from the cartridge receiving chamber, one must first separate the transparent rear outer cover from the opaque rear cover part.

SUMMARY OF THE INVENTION

According to one aspect of the invention, a one-time-use camera comprising a main body part having a cartridge receiving chamber, a film cartridge in the chamber, and a cover part having a door cover portion closing the chamber and supported to be pivoted open to permit the film cartridge to be removed from the chamber, is characterized in that:

an outer cover over the cover part is engaged releasably with the camera to permit the outer cover to be disengaged from the camera and is connected with the door cover portion to pivot the door cover portion open when the outer cover is disengaged from the camera.

According to another aspect of the invention, a method of opening a used one-time-use camera provided with a main body part having a cartridge receiving chamber, a film cartridge in the chamber, an inner cover part having a door cover portion closing the chamber and supported to be pivoted open to permit the film cartridge to be removed from the chamber, and an outer cover over the inner cover part which is engaged releasably with the camera and is connected with the door cover portion to pivot the door cover portion open when the outer cover is disengaged from the camera, comprises the steps:

disengaging the outer cover from the camera; and moving the outer cover away from the camera and simultaneously pivoting the door cover portion open.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
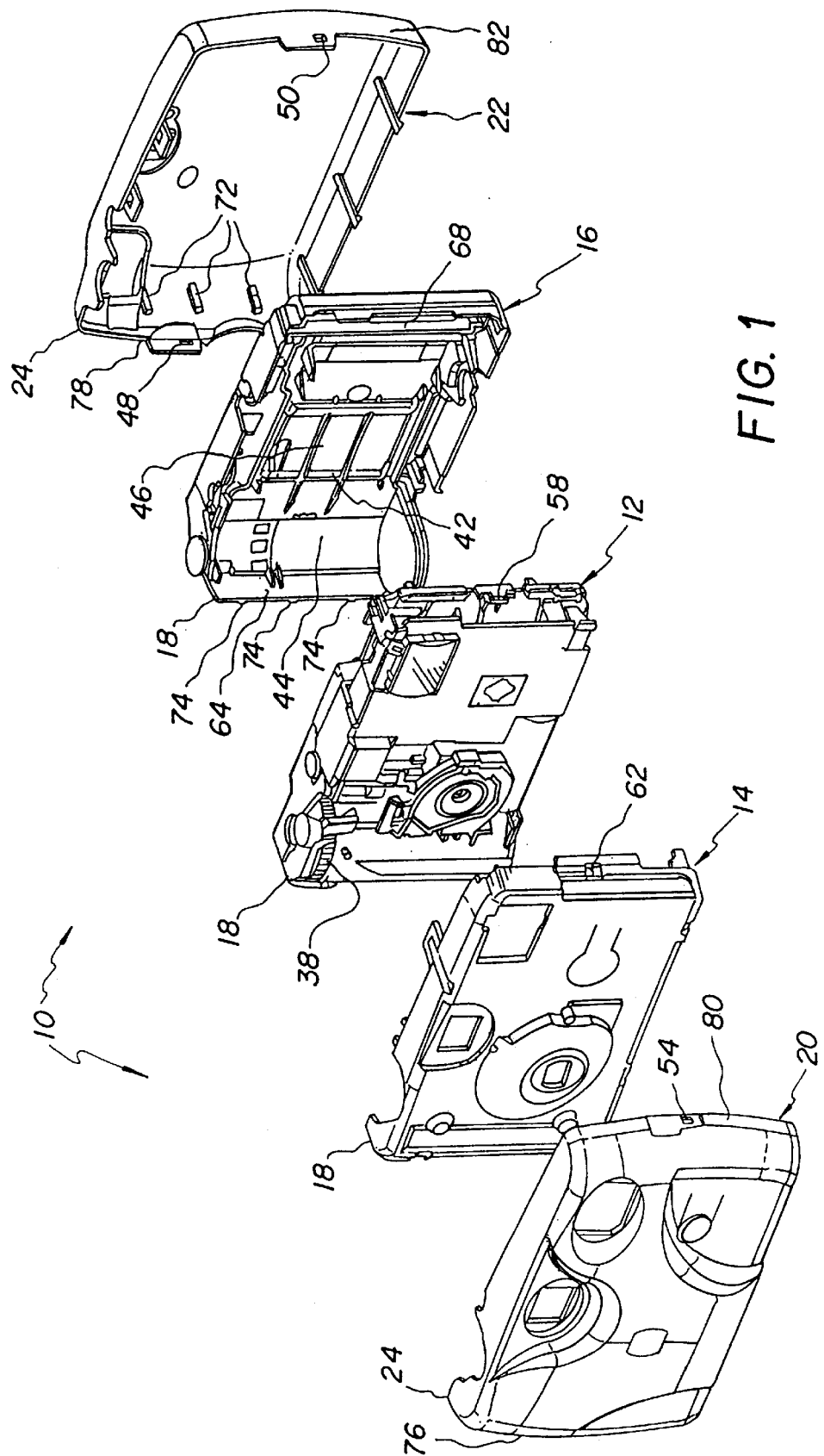
FIG. 1 is an exploded front perspective view of a one-time-use camera consistent with a preferred embodiment of the invention.
Figure 2:
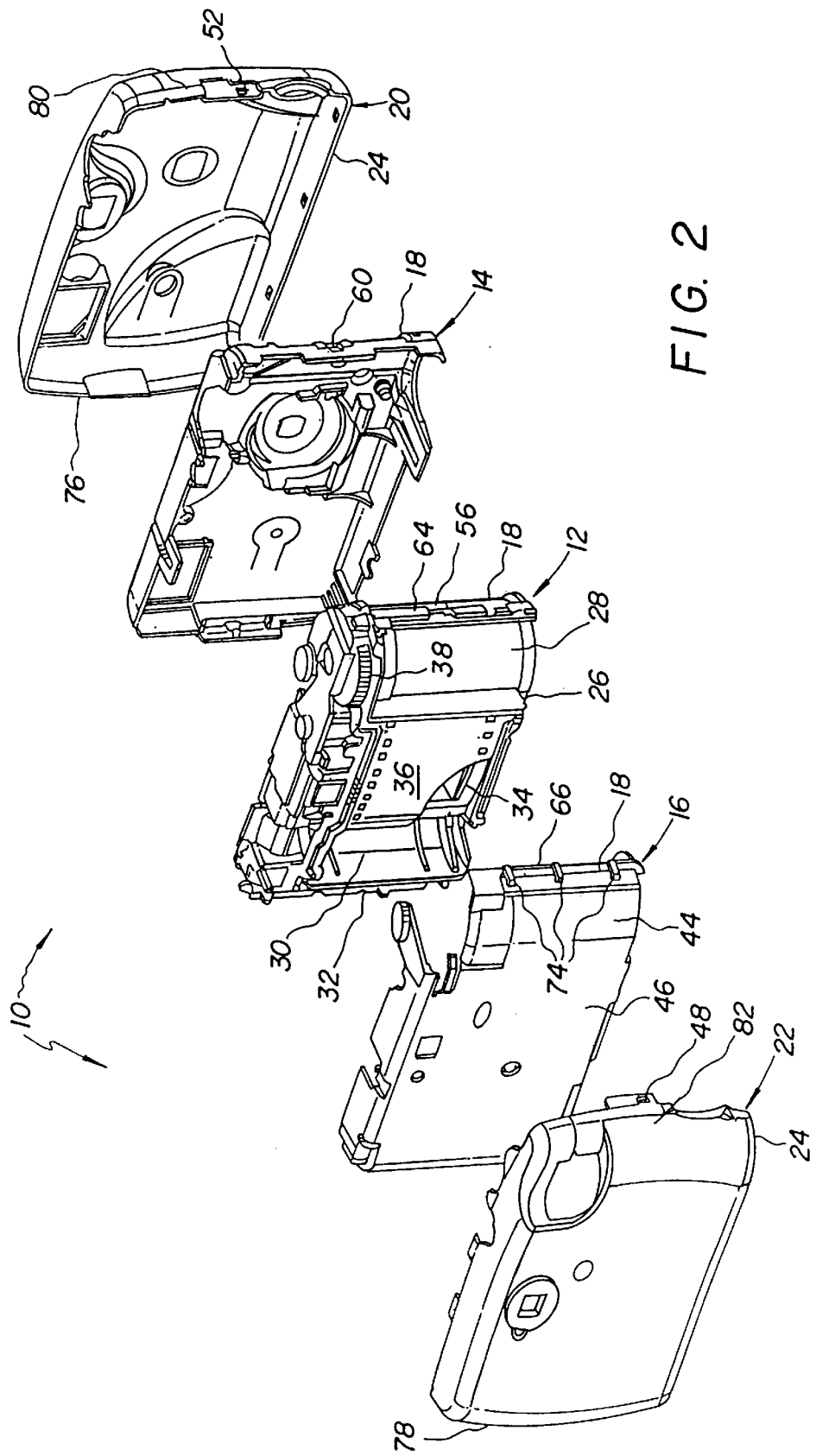
FIG. 2 is an exploded rear perspective view of the one-time-use camera.
Figure 3:
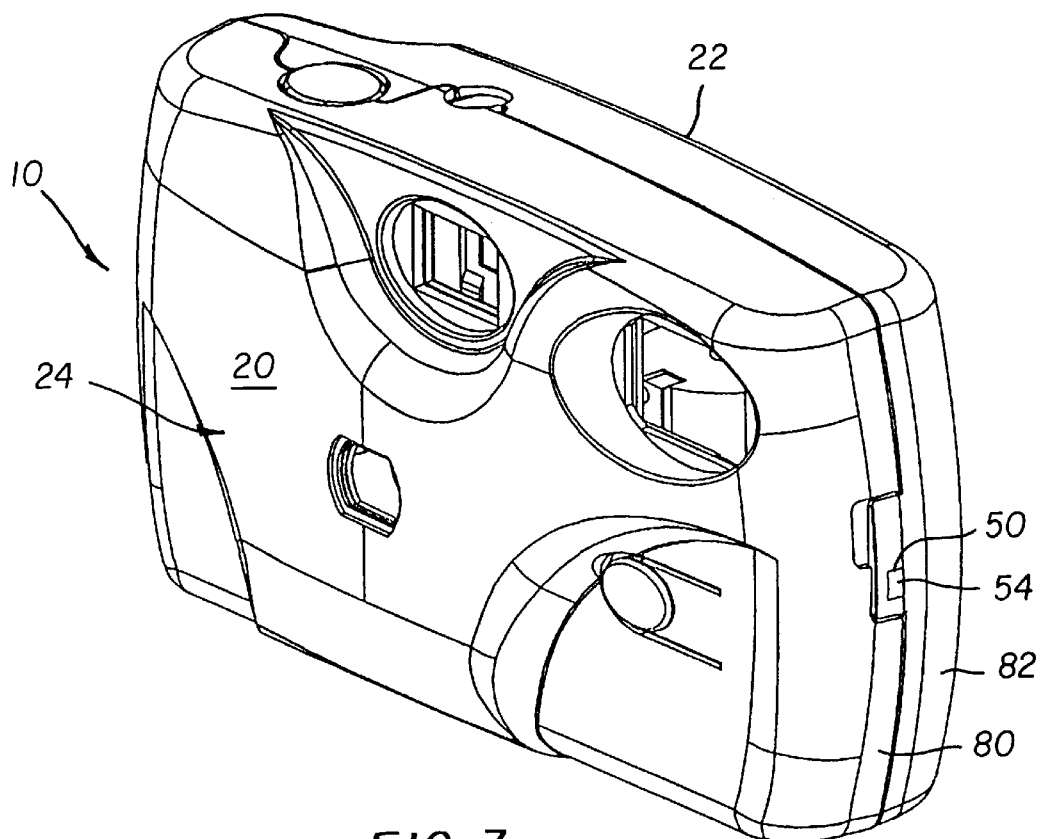
FIG. 3 is an assembled front perspective view of the one-time-use camera.

Referring now to the drawings, FIGS. 1–3 show a water-resistant one-time-use camera 10 in which an opaque main body part 12 is contained in a pair of opaque front and rear inner cover parts 14 and 16. The main body part 12 and the front and rear inner cover parts 14 and 16 are a camera or picture-taking unit 18. A pair of light-transmitting, i.e. transparent or translucent, front and rear outer covers 20 and 22 house the camera unit 18 between them to complete the water-resistant one-time-use camera 10. The front and rear outer covers 20 and 22 form a water-resistant casing 24 for the camera unit 18. Alternatively, the front and rear outer covers 20 and 22 can be painted.

Figure 4:
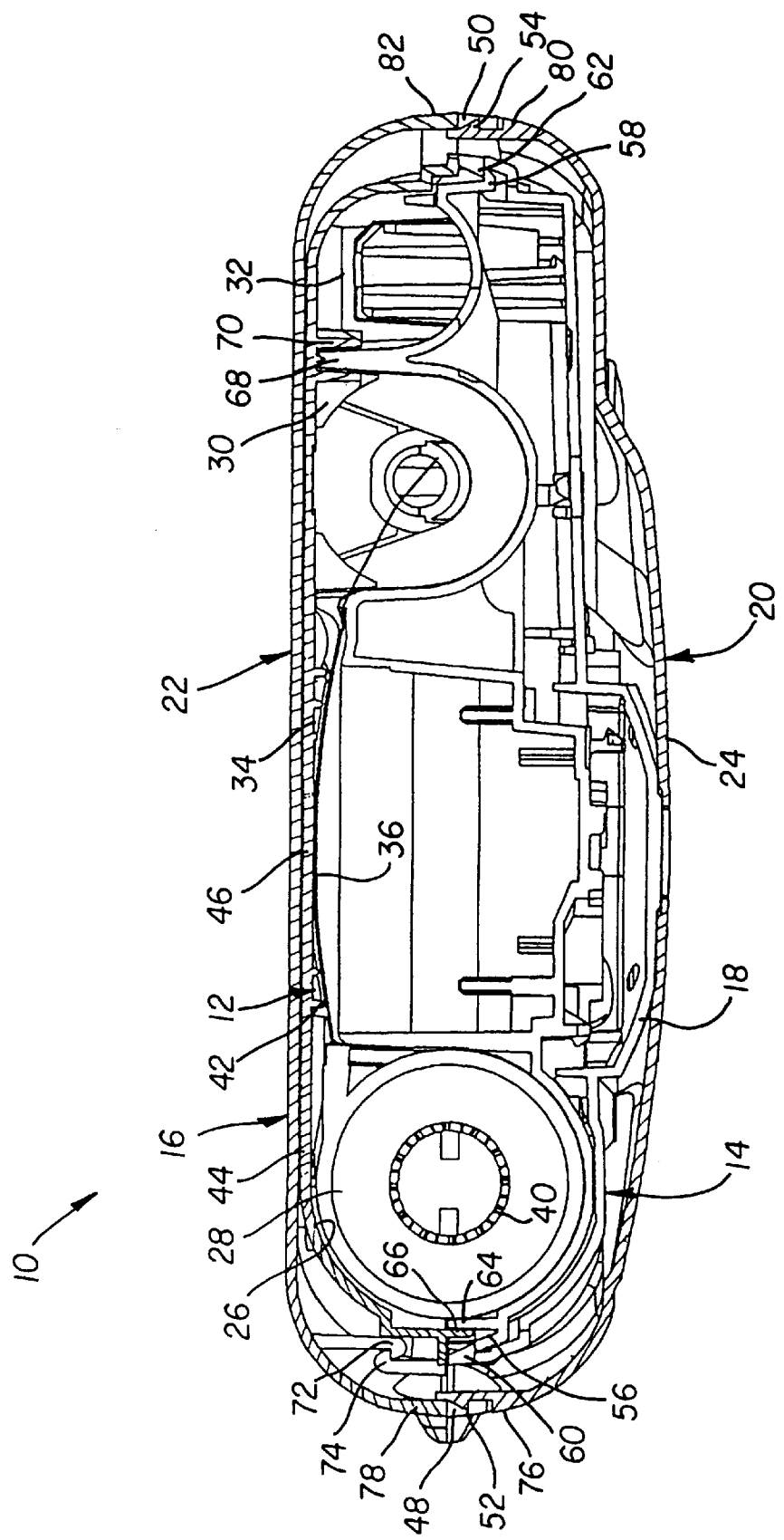
FIG. 4 is a top plan view of the one-time-use camera with the top of the camera removed to illustrate the interior of the camera.
Figure 5:
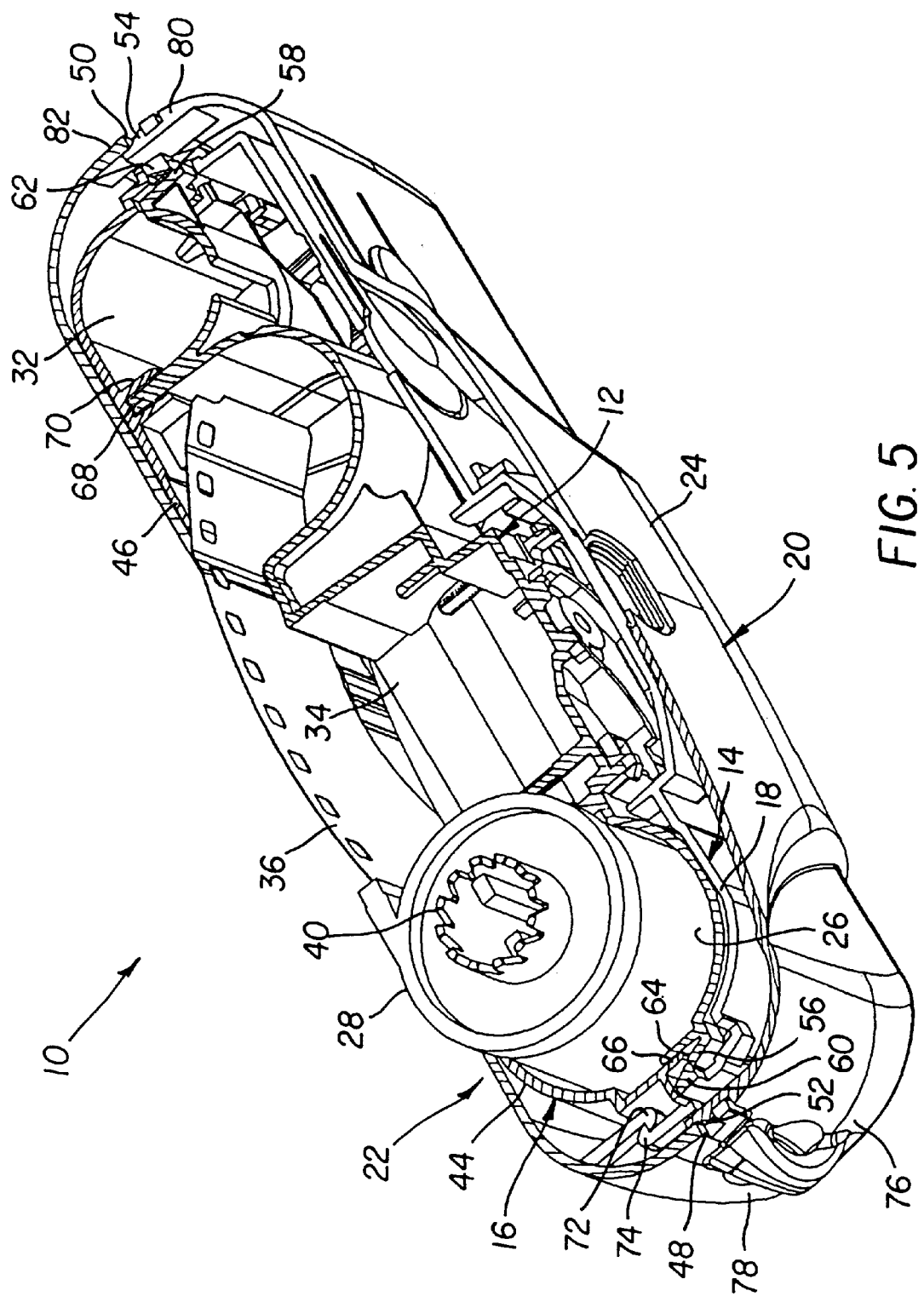
FIG. 5 is a top perspective view similar to FIG. 4.
Figure 6:
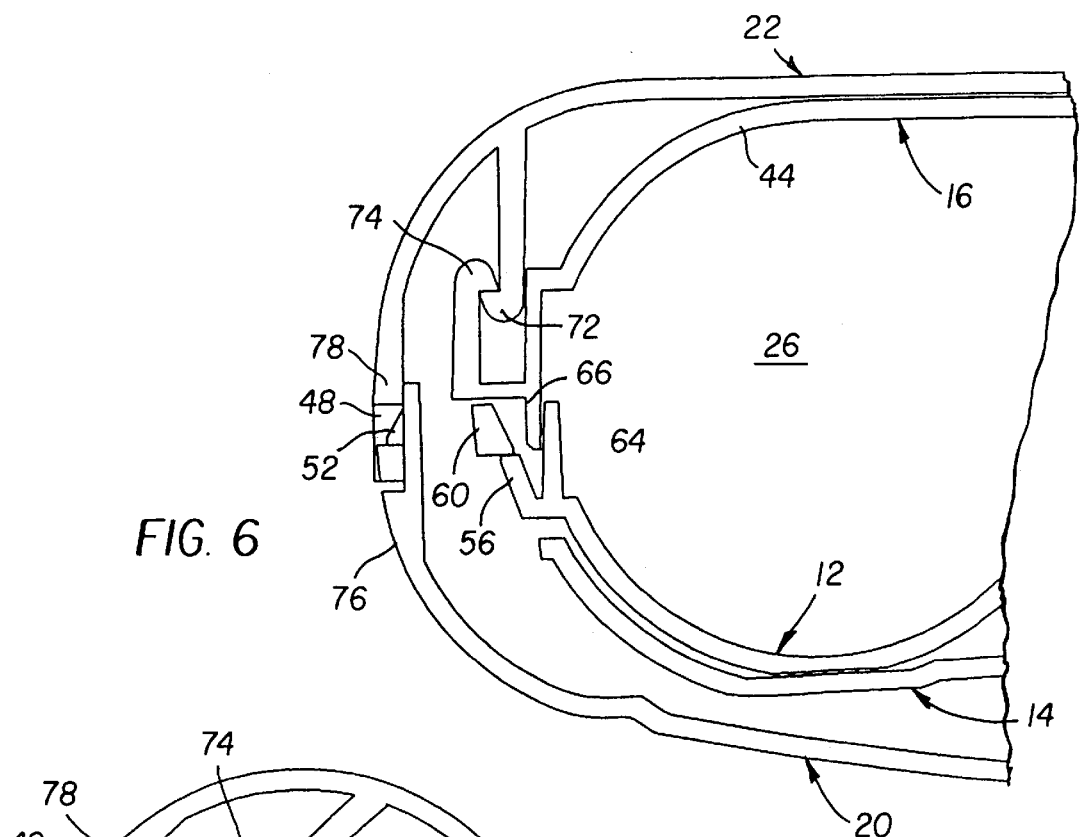
FIG. 6 is a sectional view of one end of the camera.

The main body part 12 has a rearwardly open cartridge receiving chamber 26 for a film cartridge 28, a rearwardly open film supply chamber 30 for an unexposed film roll (not shown), and a rearwardly open battery chamber 32. See FIG. 2. A backframe opening 34 is located between the cartridge receiving chamber 26 and the film supply chamber 30 for exposing successive imaging sections of a filmstrip 36 initially stored on the unexposed film roll. A film winding thumbwheel 38 is rotatably supported on the main body part 12 and has a depending coaxial stem (not shown) in coaxial engagement with one end 40 of a film spool in the film cartridge 28. See FIGS. 2, 4 and 5. Manual winding rotation counter-clockwise in FIG. 2 similarly rotates the film spool 40 to wind each exposed section of the filmstrip 36 into the film cartridge 28.

A fracture line of weakness 42 or v-shaped groove divides a film door cover portion 44 of the rear inner cover part 16 and a remaining cover portion 46 of the rear inner cover part along a pivot axis of the film door cover portion. See FIG. 2. The film door cover portion 44 can be pivoted open relative to the remaining cover portion 46 along the fracture line of weakness 42 to permit the film cartridge 28 to be removed from the cartridge receiving chamber 26.

The front and rear outer covers 20 and 22 are connected to one another as shown in FIGS. 1, 2 and 4–6 via a pair of end holes 48 and 50 in the rear outer cover and a pair of end hooks 52 and 54 on the front outer cover. The end hooks 52 and 54 are engagingly received in the end holes 48 and 50 to connect the front and rear outer covers 20 and 22, and are resiliently supported to permit them to be readily removed from the end holes to disconnect the front and rear outer covers.

The main body part 12 and the front inner cover part 14 are optionally connected to one another as shown in FIGS. 1, 2 and 4–6 via a pair of end lips 56 and 58 on the main body part and a pair of end hooks 60 and 62 on the front inner cover part. The end hooks 60 and 62 engage the respective end lips 56 and 58 to connect the front inner cover part 14 and the main body part 12, and are resiliently supported to permit them to be separated from the end lips to disconnect the front inner cover part and the main body part.

Mutually overlapping wall portions 64 and 66 of the main body part 12 and the rear inner cover part 16 serve as a light-lock at the cartridge receiving chamber 26. See FIGS. 1, 2 and 4–6. Mutually overlapping wall portions 68 and 70 of the main body part 12 and the rear inner cover part 16 serve as a light-lock at the film supply 30.

Three identical hooks 72 on the rear outer cover 22 engage respective hooks 74 on the film door cover portion 44 of the rear inner cover part 16 to connect the rear outer cover and the film door cover portion. See FIGS. 1, 2 and 4–6. The six hooks 72 and 74 are resiliently supported to permit them to be disengaged. The outer cover 22 and the film door cover portion 44 can be connected in other ways, such as hooks engagingly received in holes.

Figure 9:
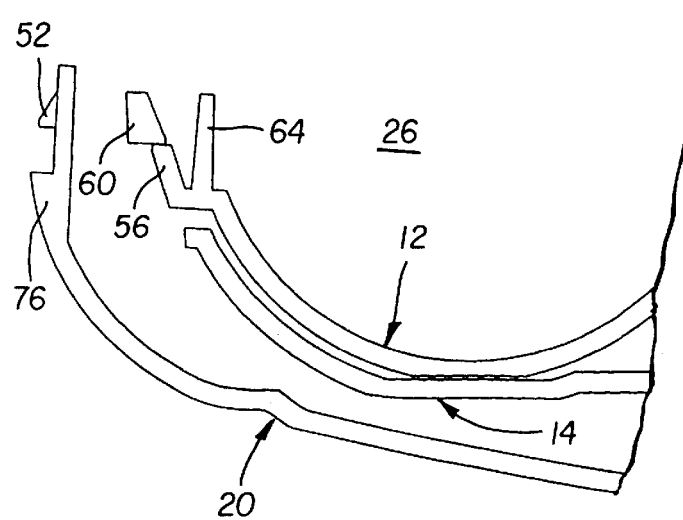
FIGS. 7, 8 and 9 depict a method of opening the camera.
Figure 7:
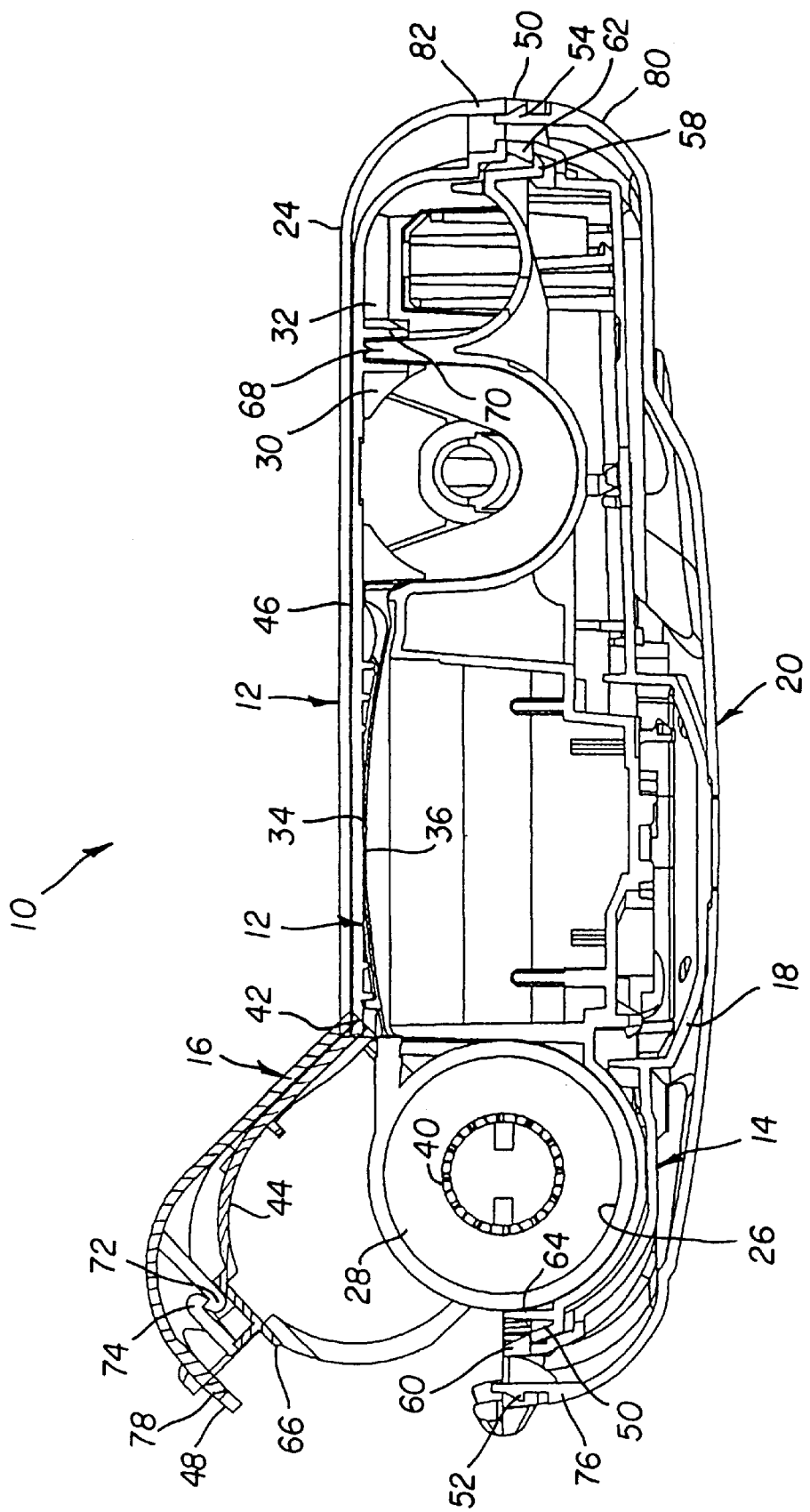
Figure 8:
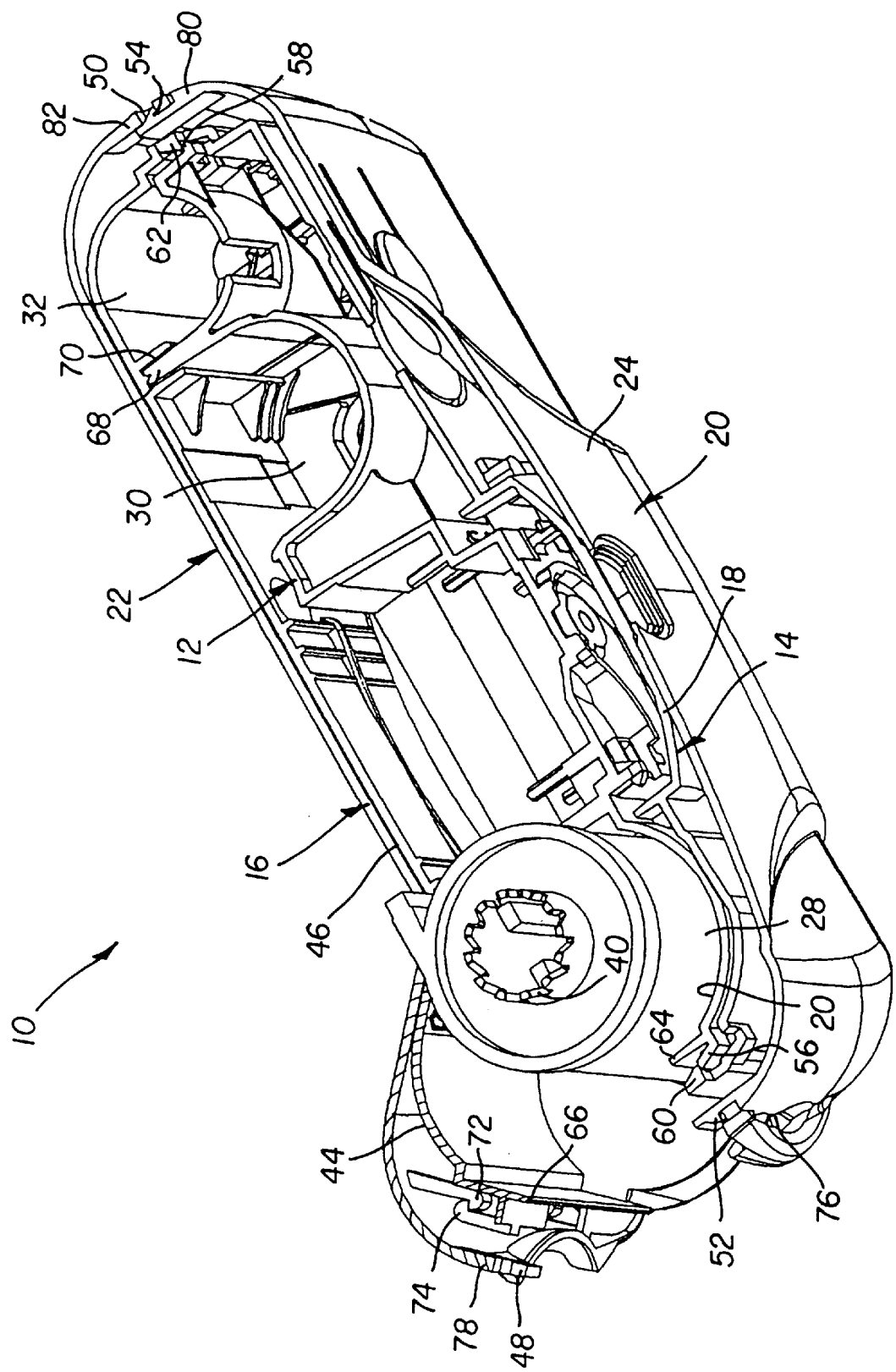

A method of opening the one-time-use camera 10 after the filmstrip 36 has been completely into the film cartridge 28 is illustrated in FIGS. 7–9. The method comprises the following steps. First, the end hook 52 is removed from the end hole 48 to disconnect the front and rear outer covers 20 and 22 at respective adjoining ends 76 and 78 of the front and rear outer covers. The end hook 54 is left in the end hole 50 in order to leave the front and rear outer covers connected at respective adjoining ends 80 and 82 of the front and rear outer covers. Then, the disconnected end 78 of the rear outer cover 22 is pried away from the adjoining end 76 of the front outer cover 20 to simultaneously pivot the film door cover portion 44 of rear inner cover part 16 open relative to the remaining cover portion 46 of the rear inner cover part along the fracture line of weakness 42. This permits the film cartridge 28 to be removed from the cartridge receiving chamber 26. The film door cover portion 44 is pivoted open because of the engagement of the three hooks 72 on the rear outer cover 22 with the three hooks 74 on the film door cover portion 44.

A method of closing the one-time-use camera 10 when it is recycled comprises the following steps. First, the rear outer cover 22 is pivoted to position the end hook 52 to be received in the end hole 48. Simultaneously, the film door cover portion 44 of rear inner cover part 16 is pivoted closed relative to the remaining cover portion 46 of the rear inner cover part along the fracture line of weakness 42. See FIGS. 9 and 6. Then, the end hook 52 to inserted into the end hole 48 to connect the front and rear outer covers 20 and 22 at their adjoining ends 76 and 78.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. front inner cover part
16. rear inner cover part
18. camera unit
20. front outer cover
22. rear outer cover
24. water-resistant casing
26. cartridge receiving chamber
28. film cartridge
30. film supply chamber
32. battery chamber
34. backframe opening
36. filmstrip
38. thumbwheel
40. spool end
42. fracture line of weakness
44. film door cover portion
46. remaining cover portion
48. end hole
50. end hole
52. end hook
54. end hook
56. end lip
58. end lip 60. end hook
62. endhook
64. wall portion
66. wall portion
68. wall portion
70. wall portion
72. hook
74. hook
76. adjoining end
78. adjoining end
80. adjoining end
82. adjoining end

What is claimed is:

1. A one-time-use camera comprising a main body part having a cartridge receiving chamber, a film cartridge in said chamber, and a cover part having a door cover portion closing said chamber and supported to be pivoted open to permit said film cartridge to be removed from said chamber, is characterized in that:

an outer cover over said cover part is engaged releasably with said camera to permit said outer cover to be disengaged from said camera and is connected with said door cover portion in a way that pivots said door cover portion open automatically when said outer cover is disengaged from said camera.

2. A one-time-use camera as recited in claim 1, wherein said outer cover is light-transmitting, and said cover part is opaque.

3. A one-time-use camera comprising a main body part having a cartridge receiving chamber, a film cartridge in said chamber, a rear inner cover part having a door cover portion closing said chamber and supported to be pivoted open to permit said film cartridge to be removed from said chamber, a front inner cover part that together with said rear inner cover part house said main body part between them, and a pair of front and rear outer covers connected to one another over said front and rear inner cover parts, is characterized in that:

said rear outer cover is engaged releasably with said front outer cover to permit said rear outer cover to be disengaged from said front outer cover and is connected with said door cover portion in a way that pivots said door cover portion open automatically when said rear outer cover is disengaged from said front outer cover.

4. A method of opening a used one-time-use camera provided with a main body part having a cartridge receiving chamber, a film cartridge in the chamber, an inner cover part having a door cover portion closing the chamber and supported to be pivoted open to permit the film cartridge to be removed from the chamber, and an outer cover over the inner cover part which is engaged releasably with the camera and is connected with the door cover portion to pivot the door cover portion open when the outer cover is disengaged from the camera, said method comprising the steps:

first disengaging the outer cover from the camera; and then moving the disengaged outer cover away from the camera and simultaneously pivoting the door cover portion open.

5. A method of opening a used one-time-use camera provided with a main body part having a cartridge receiving chamber, a film cartridge in the chamber, a rear inner cover part having a door cover portion closing the chamber and supported to be pivoted open to permit the film cartridge to be removed from the chamber, a front inner cover part that together with the rear inner cover part house the main body part between them, and front and rear outer covers connected to one another at respective pairs of adjoining opposite ends of the front and rear outer covers and the rear outer cover part is connected with the door cover portion to pivot the door cover portion open when the rear outer cover is disengaged from the front outer cover at one pair of their adjoining opposite ends, said method comprising the steps:

first disengaging the rear outer cover from the front outer cover at one pair of their adjoining opposite ends and leaving the rear and front outer covers engaged at another pair of their adjoining opposite ends; and then prying the disengaged end of the rear outer cover away from the disengaged end of the front outer cover and simultaneously pivoting the door cover portion open.

6. A method of closing a recycled one-time-use camera provided with a main body part having a cartridge receiving chamber, a film cartridge in the chamber, an inner cover part having a door cover portion that can be pivoted closed to close the chamber, and an outer cover connected with the door cover portion to pivot the door cover portion closed when the outer cover is moved to engage with the camera, said method comprising the steps:

first moving the outer cover to engage with the camera and simultaneously pivoting the door cover portion closed; and then engaging the outer cover with the camera to hold the door cover portion closed.

\* \* \* \* \*